United States Patent
Mauer et al.

(10) Patent No.: US 9,374,751 B1
(45) Date of Patent: Jun. 21, 2016

(54) BILATERAL TRANSITION OF CONTROL COMMUNICATION FOR CONTROL OF MOBILE CRAFT

(71) Applicant: Sprint Spectrum L.P., Overland Park, KS (US)

(72) Inventors: Brian D. Mauer, Shawnee, KS (US); James Ralston, Lenexa, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/750,398

(22) Filed: Jun. 25, 2015

(51) Int. Cl.
*H04W 36/00* (2009.01)
*H04W 36/14* (2009.01)
*H04W 4/00* (2009.01)
*H04B 17/318* (2015.01)
*H04B 17/309* (2015.01)
*G05D 1/00* (2006.01)

(52) U.S. Cl.
CPC ............ *H04W 36/14* (2013.01); *G05D 1/0022* (2013.01); *H04B 17/309* (2015.01); *H04B 17/318* (2015.01); *H04W 4/008* (2013.01)

(58) Field of Classification Search
CPC .......... B64C 2201/146; B64C 39/024; G05D 1/0022; H04W 36/0083; H04W 76/023; H04W 76/027; H04W 88/06; H04W 8/005
See application file for complete search history.

(56) References Cited

U.S. PATENT DOCUMENTS

| 7,581,702 | B2 | 9/2009 | Olson et al. |
| 2009/0322877 | A1 | 12/2009 | Tigner |
| 2010/0224732 | A1 | 9/2010 | Olson et al. |
| 2013/0324114 | A1 | 12/2013 | Raghothaman et al. |
| 2014/0185529 | A1* | 7/2014 | Lim ................ H04W 76/023 370/328 |
| 2014/0269610 | A1* | 9/2014 | Hiben ................ H04W 36/14 370/331 |
| 2015/0156693 | A1* | 6/2015 | Tabet ................ H04W 36/30 455/437 |

* cited by examiner

*Primary Examiner* — Quan M Hua

(57) ABSTRACT

Disclosed is a method and system to help facilitate continued control of a mobile craft in a situation where the wireless link between the controller and mobile craft degrades. In accordance with the disclosure, the controller and mobile craft will each independently detect threshold degradation of their direct wireless link and will each respond to its detecting of the threshold degradation by acquiring a cellular wireless connection with a cellular radio access network and communicating via its acquired cellular wireless connection with a network-based control server. The control server will then automatically bridge together its communication with the controller and its communication with the mobile craft so as to enable the controller to continue controlling the mobile craft.

18 Claims, 4 Drawing Sheets

BILATERAL TRANSITION OF CONTROL COMMUNICATION FOR CONTROL OF MOBILE CRAFT

BACKGROUND

Unless otherwise indicated herein, the description provided in this section is not itself prior art to the claims and is not admitted to be prior art by inclusion in this section.

Radio controlled mobile craft are vehicles or other mobile objects whose motion and perhaps other operational parameters can be controlled from a distance using a specialized transmitter or other controller. Such mobile craft could be air-based, land-based, and/or water-based, and could have hobby, commercial, military, or other use.

An example that has gained widespread attention in recent years is the quadcopter, also known as a quadrocoptor or quad rotor helicopter. A quadcopter is a multirotor helicopter that is lifted and propelled by four fixed-pitch propellers rotors, two of which rotate clockwise and the other two of which rotate counterclockwise. By precisely and accurately spinning these four propellers at different speeds through radio control, it is possible to control various directional movements of the quadcopter, such as hover, forward/backward movement, left/right movement, and yaw (rotation). In practice, a user may thus operate a handheld controller to control movement of the quadcopter by wireless sending of control signals that cause adjustment of the propellers' respective speeds. Further, the controller may also facilitate remote control of other features of the quadcopter, such as power, lights, sounds, and the like. In addition, the quadcopter itself may be equipped to wirelessly transmit to the controller, such as to acknowledge control commands, to report operational metrics, and/or to transmit a live video feed captured by an on-board camera.

Numerous other examples of radio controlled mobile craft are also known or may be developed later as well.

OVERVIEW

In basic operation, a controller may communicate with a mobile craft through a direct wireless link using a short-range wireless communication protocol such as Bluetooth, WiFi, ZigBee, FM radio, or the like. In particular, the controller and mobile craft may be equipped with processors and radios that enable them to communicate with each other using such a protocol on a defined or dynamically selected frequency channel. Through such a communication channel, the controller and mobile craft may be configured to engage in control communication with each other, with control commands and feedback being modulated by an agreed modulation scheme such as pulse code modulation for instance. Further, through their direct wireless link, the controller and mobile craft may be configured to engage in other forms of control communication and to exchange other non-control data, such as video feeds, location data, and the like.

In practice, for instance, a user operating a hand-held controller may use the controller to power on the mobile craft and to cause the mobile craft to begin moving, and the user may then continue to use the controller to control movement of the mobile craft. If the mobile craft is a quadcopter, for instance, the user may use the controller to power on the quadcopter and to cause its propellers to rotate in a manner that results in the quadcopter hovering. Further, the user may then continue to use the controller to cause the quadcopter to fly in various directions.

Ideally, the short-range wireless link between the controller and the mobile craft will support continued communication between the controller and mobile craft as the mobile craft moves away from the controller, and in the face of any interference on the wireless link. Unfortunately, however, the wireless link may degrade due to distance, interference, and/or other reasons. Consequently, at some point, the controller and mobile craft may lose the ability to communicate with each other, which could give rise to numerous issues, including uncontrolled movement of the mobile craft.

Disclosed herein is a method and system to help facilitate continued control of a mobile craft in a situation where the wireless link between the controller and mobile craft degrades. In accordance with the disclosure, the controller and mobile craft will each independently detect threshold degradation of their direct wireless link and will each respond to its detecting of the threshold degradation by acquiring a cellular wireless connection with a cellular radio access network and communicating via its acquired cellular wireless connection with a network-based control server. The control server will then automatically bridge together its communication with the controller and its communication with the mobile craft so as to enable the controller to continue controlling the mobile craft.

Accordingly, in one respect, disclosed is a method for managing control communication between a controller and a mobile craft, to facilitate control of the mobile craft by the controller, where the controller includes a cellular radio and a short-range radio, and where the mobile craft also includes a cellular radio and a short-range radio. Per the method, the controller and mobile craft engage in direct short-range wireless communication with each other via a short-range wireless link between their respective short-range radios, and, through the direct short-range wireless communication, the controller controls the mobile craft.

In one implementation, the controller and mobile craft then each independently detect threshold degradation of the short-range wireless link and each respond to its detecting of the threshold degradation by (i) using its respective cellular radio to acquire a respective cellular wireless connection and (ii) engaging in respective communication, via its acquired respective cellular wireless connection, with a control server. Further, the control server then bridges the respective communication of the controller with the respective communication of the mobile craft, so as to enable the controller to continue controlling the mobile craft.

More particularly, the controller and mobile craft each independently detect threshold degradation of the short-range wireless link and each respond to its detecting of the threshold degradation by (i) powering on its respective cellular wireless radio, (ii) using its respective powered-on cellular radio to acquire a respective cellular wireless connection and (iii) engaging in respective communication, via its acquired respective cellular wireless connection, with a control server on a packet-switched network. Further, the control server then determines that the controller is authorized to control the mobile craft, and, in response to at least that determination, the control server forwards to the mobile craft one or more control-directives that the control server receives from the controller, the one or more control-directives controlling operation of the mobile craft.

In another respect, disclosed is a method also for managing control communication between a controller and a mobile craft, to facilitate control of the mobile craft by the controller, where the controller includes a respective cellular radio and a respective short-range radio, and where the mobile craft also includes a respective cellular radio and a respective short-range radio. This method involves providing the controller and mobile craft (such as by distributing application software that will cause a smart phone or other device to function as the controller, and by selling or otherwise distributing the mobile craft), with the controller and mobile craft each being configured to engage in direct short-range wireless communication with each other via a short-range wireless link between their respective short-range radios, so that, through the direct short-range wireless communication, the controller can control the mobile craft. Further, the method involves operating a control server for automatically bridging control communications between the controller and the mobile craft.

In practice, the provided controller and mobile craft are each configured to independently detect threshold degradation of the short-range wireless link and to each respond to the detecting of threshold degradation by (i) using its respective cellular radio to acquire a respective cellular wireless connection and (ii) engaging in respective communication, via its acquired respective cellular wireless connection, with the control server. Further, the control server is configured to automatically determine that the controller is authorized to control the mobile craft, and, in response to the determining, to forward to the mobile craft one or more control-directives that the control server receives from the controller, where the one or more control-directives control operation of the mobile craft.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
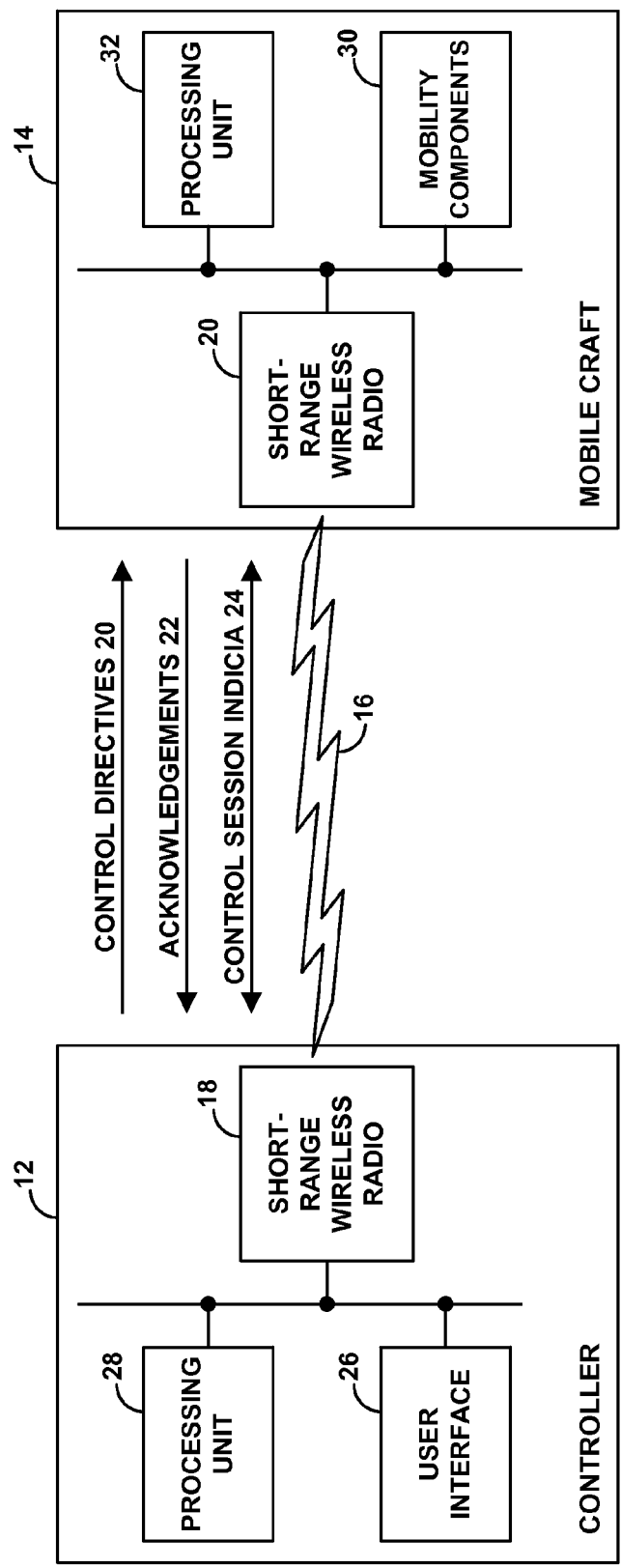
FIG. 1 is a simplified block diagram depicting wireless control communication between a controller and a mobile craft.

Referring to the drawings, as noted above, FIG. 1 is a simplified block diagram depicting direct wireless communication between a controller 12 and a mobile craft 14. In this example arrangement, the mobile craft 14 could be a quadcopter or other unmanned vehicle or mobile object that is configured to receive and respond to control directives from the controller, particularly including directives for controlling movement of the mobile craft. The controller could then be a specialized device configured to send such control directives to the mobile craft or could be (or include) a generalized device such as a programmed smart phone or the like similarly configured to send such control directives to the mobile craft. In practice, the controller may be arranged to be handheld and operated by a user, so that a user operating the controller can, through input into the controller, cause the controller to send control directives to the mobile craft so as to control movement and perhaps other operation of the mobile craft.

In the arrangement shown, the controller 12 and mobile craft 14 are in direct short-range wireless communication with each other over a direct wireless link 16 that extends between the controller and mobile craft. This communication is considered to be "short-range" because it is direct peer-to-peer wireless communication that would likely be at a relatively short distance given transmission power limitations, rather than through a serving radio access network or the like. Examples of short-range wireless communication protocols include those noted above, among others now known or later developed.

To facilitate this direct short-range wireless communication, the controller and mobile craft are each equipped with a short-range wireless radio suitable for wirelessly communicating with the other's short-range wireless radio. In particular, the controller is equipped with a short-range wireless radio 18, and the mobile craft is equipped with a short-range wireless radio 20. These radios operate according to at least a common short-range wireless communication protocol and may be set to communicate with each other on the same frequency channel, using an agreed modulation scheme. Though not shown, each radio may include or be interconnected with a suitable antenna arrangement, to facilitate the wireless communication.

The direct wireless link 16 serves to carry control communications wirelessly between the controller 12 and the mobile craft 14. As shown, these control communications include control directives 20 from the controller that cause changes in movement and other operation of the mobile craft, and perhaps acknowledgements 22 from the mobile craft to signify successful receipt/processing of such control directives. Further, the control communications may also include control session indicia 24 related generally to the control communication between the controller and mobile craft, such as handshake signaling between the controller and mobile craft to establish their control communication, periodic keep-alive or heartbeat signals and/or pilot or reference type signaling between the controller and mobile craft to help facilitate evaluation of the wireless link, and the like. These and/or other communications between the controller and mobile craft may be expressed in digital form, modulated on the physical wireless link, such as through use of pulse code modulation or another agreed scheme.

In an example implementation, the controller and mobile craft may be configured to engage in control communication with each other over this direct wireless link, preferably in a manner that prevents the controller from inadvertently controlling a different mobile craft and that prevents the mobile craft from being inadvertently controlled by a different controller. To facilitate this, the controller and mobile craft may be programmed with a common control-communication identifier of some type, and they may signal the identifier to each other at the start of and/or throughout their control communication, and the mobile craft may be configured to respond to control directives only from the controller that provides the expected control-communication identifier.

By way of example, the controller and mobile craft may be pre-set with a common control-communication identifier during a manufacturing or wireless pairing process. The controller may then transmit the identifier to the mobile craft in an initial handshake process, along with a physical identifier of the controller, at the start of a control communication session, and the mobile craft may verify that the identifier matches its identifier as a condition for the mobile craft then responding to control directives from the controller having that physical identifier. Alternatively or additionally, for possible added security, the controller and mobile craft could establish a new control-communication identifier each time the controller sends a directive or other communication to the mobile craft, such as with the mobile craft responding with an acknowledgement providing a next control-communication identifier, and the controller then conveying that next control-communication identifier with the next directive it sends to the mobile craft. This or another such rolling-identifier mechanism could help make the control communication between the controller and the mobile craft even more secure.

In practice, as further shown, the controller may have a user interface 26 through which to receive user commands to which the controller would respond by sending corresponding control directives to the mobile craft to control movement or other operation of the mobile craft. The user interface could include tactile buttons, joysticks, and/or other mechanisms, a touch screen for graphical user interface interaction with a user, and/or a microphone and speaker for voice or other audio based interaction with a user. Further, the controller may have a processing unit 28, such a microprocessor or the like, programmed with instructions executable to carry out various controller operations described herein. Although not shown, the controller may also have a battery or other power source for supplying energy to various components of the controller.

The mobile craft, on the other hand, may include mobility components 30 such as various sensors and components for controlling movement of the mobile craft. For instance, a quadcopter may include a processor-controlled motor respectively for each of its four propellers to control speed of rotation of each propeller. Further, the mobile craft may likewise have a processing unit 32, such as a microprocessor or the like, programmed with instructions executable to carry out various mobile craft operations described herein. And also as not shown, the mobile craft may similarly include a battery or other power source for supplying energy to various components of the mobile craft.

As noted above, the present disclosure addresses a problematic situation where the wireless link between the controller and mobile craft degrades to the point that the controller can no longer communicate with the mobile craft. The disclosure helps to avoid or reduce the risk of that situation by introducing a bilateral transition process, in which the controller and mobile craft each independently detects threshold degradation of the wireless link and each responds to its detecting of the threshold degradation by acquiring a cellular wireless connection and engaging in communication via its acquired cellular wireless connection with a network-based control server, and in which the control server automatically bridges together communications with the controller and mobile craft so that the controller can continue to control the mobile craft.

Figure 2:
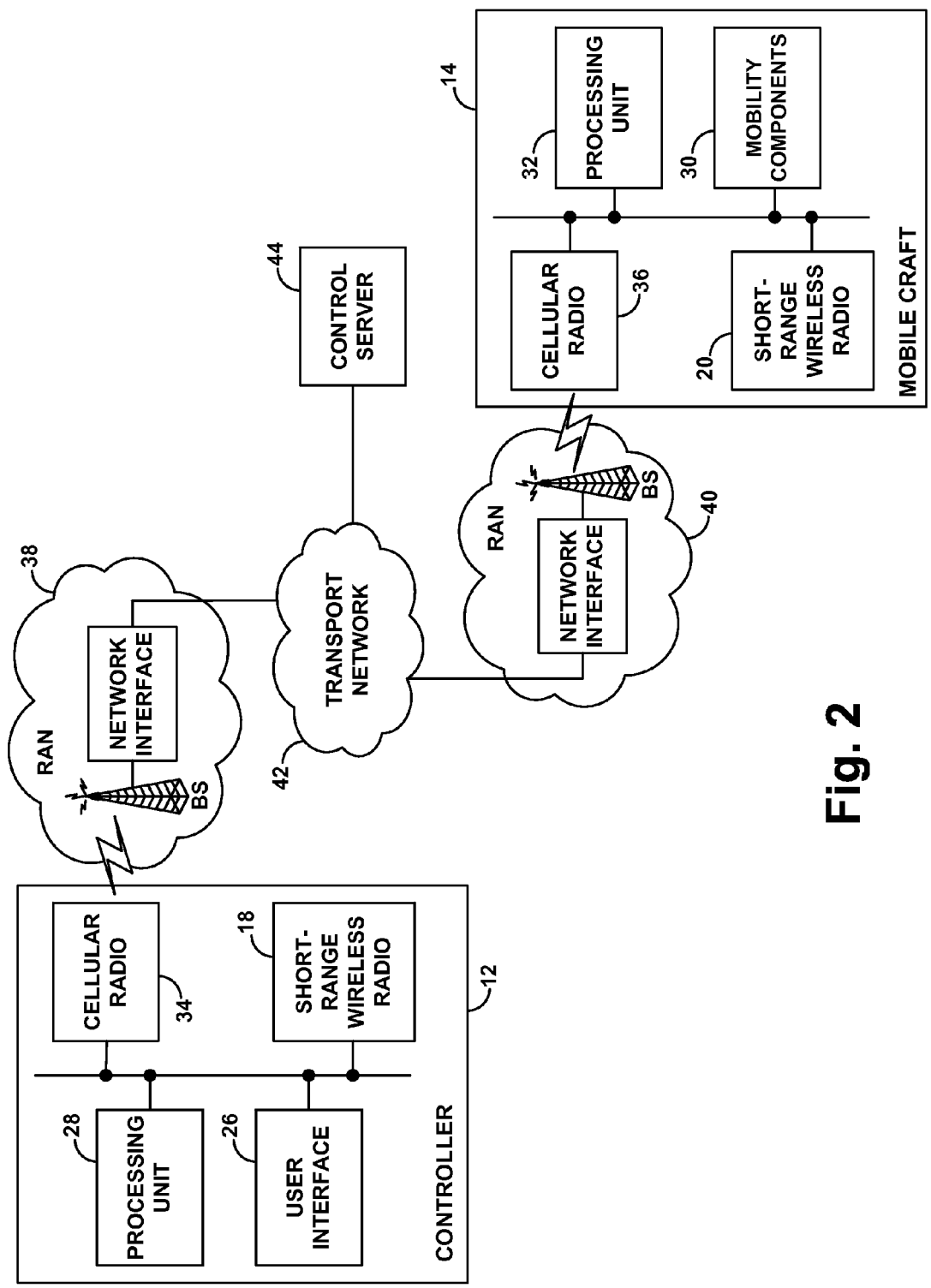
FIG. 2 is a simplified block diagram depicting an arrangement in which the controller and mobile craft may communicate via respective cellular wireless connections with a control server that bridges control communication between the controller and mobile craft.

To facilitate this process, as shown next in FIG. 2, the controller and mobile craft are each further equipped with a cellular wireless radio of the type configured to be served by a cellular carrier's network in the manner that smart phones are normally served by a cellular carrier's network. In particular, the controller is equipped with a cellular radio 34, and the mobile craft is equipped with a cellular radio 36. These radios could be integrated with short-range wireless radios 20, 22, such as being provided on a common chipset for instance, or could be provided as separate components. Further, each of these cellular radios may also include or be interconnected with a suitable antenna arrangement to facilitate cellular wireless communication.

Each cellular radio, or the controller or mobile craft that contains the cellular radio, may subscribe to service of a cellular carrier that operates one or more cellular radio access networks (RANs), to facilitate being served the cellular carrier when necessary. Further, each such RAN may be configured to provide cellular wireless communication service according to a cellular air interface protocol, such as orthogonal frequency division multiple access (OFDMA (e.g., Long Term Evolution (LTE) or Wireless Interoperability for Microwave Access (WiMAX)), code division multiple access (CDMA), or global system for mobile communication (GSM), among others now known or later developed. And each cellular radio may be configured to be served by one or more such RANs according to the RANs' air interface protocols.

In the present process, the controller and mobile craft may each end up being served by a different RAN. In particular, as shown in FIG. 2, the controller may end up being served by one RAN 38, and the mobile craft may end up being served by another RAN 40. This may happen, for instance, where the controller and mobile craft are served in different coverage areas (e.g., different cells or sectors) of a common cellular wireless system, are served by different cellular wireless carriers, are served by cellular wireless systems operating according to different air interface protocols, or in other circumstances, possibly as a result of the controller and mobile craft being sufficiently distant from each other to end up communicating with different base stations. Alternatively, the controller and mobile craft could end up being served by the same RAN.

For simplicity, FIG. 2 depicts each RAN 38, 40 as including a base station and supporting network infrastructure, and both RANs as providing connectivity with a common transport network 42, such as the Internet for instance. In such RAN, the base station may take various forms (e.g., as a macro base station or small cell base station) and radiates to provide cellular wireless coverage in which to serve subscriber devices according to a cellular air interface protocol. The base station is then coupled with the supporting network infrastructure, such as one or more switches or gateways, that provide connectivity in turn with the transport network 42.

With this arrangement, when a cellular radio is powered on and within coverage of a base station, the cellular radio may engage in a process to acquire cellular wireless connectivity with the RAN so as to then communicate via the RAN with entities on the transport network 42. For instance, upon being powered on, the cellular radio may scan for a pilot or reference signal broadcast by the base station and, upon detecting such a signal of sufficient strength, may then engage in access signaling with the RAN and requesting a radio-link-layer connection with the RAN. As a particular example, under LTE, the cellular radio may detect a reference signal from the base station and responsively then transmit an LTE access request and request the base station to assign a radio resource control (RRC) connection defining a logical air interface connection between the base station and the cellular radio. Further, the cellular radio may engage in attach signaling with the base station, which may result in the LTE RAN and supporting network infrastructure establishing for the device one or more bearers for carrying packet-data between the device and the transport network 42 and assigning to the device an Internet Protocol (IP) address for use to engage in communication on the transport network 42.

As further shown in FIG. 2, situated on the transport network or otherwise accessible via the transport network is a control server 44. In accordance with the present disclosure, the control server operates to communicate with the controller via the controller's cellular wireless connection and with the mobile craft via the mobile craft's cellular wireless connection, and to automatically bridge together those communications so as to enable the controller to continue controlling the mobile craft. In practice, the control server may include a network communication interface for communicating on the transport network 42, and a processing unit, such a microprocessor or the like, programmed with instructions executable to carry out various control server operations described herein.

In operation, the controller 12 and mobile craft 14 will each independently monitor their direct wireless link 16 and will each independently detect threshold degradation of the wireless link, as may occur with threshold long distance between the controller and mobile craft and/or due to interference on the wireless link. The controller and mobile craft may each perform this monitoring of the wireless link 16 in the same or different ways at or around the time they are engaging or attempting to engage in control communication with each other.

By way of example, monitoring the wireless link could involve evaluating signal strength, signal-to-noise ratio, error rate, or the like with respect to communications (e.g., control directives, acknowledgements, reference signals, keep-alive signals, or the like) from the other end (the controller from the mobile craft, and the mobile craft from the controller), evaluating whether expected communications (e.g., keep-alive signals) are received from the other end, evaluating extent of received re-transmission requests in response to failed transmissions to the other end, or the like.

Detecting threshold degradation of the wireless link may then involve detecting that the quality of the wireless link is below a predefined threshold indicating loss or likely loss of communication between the controller and the mobile craft, such as that the signal strength or signal-to-noise ratio is threshold low, the error rate is threshold high, a threshold extent of expected communications have not been received, or that a threshold extent of retransmissions have occurred. The thresholds at issue here can be predefined in both the controller and the mobile craft and/or user defined. Optimally, the thresholds should be set so as to result in detection of threshold degradation before significant problems with communication occur between the controller and the mobile craft. However, the process could apply even after a significant problem in communication occurs.

Alternatively or additionally, the act of detecting threshold degradation of the wireless link could involve detecting that the controller and mobile craft are threshold distant from each other, and particularly that they are so far from each other that they are likely to soon lose their direct wireless link. To facilitate this, the controller and mobile craft could each include a GPS receiver and could report their GPS-determined locations to each other, so that they can each determine how far away the other is. And they could each determine when that distance is more than a threshold, possibly defined based on the short-range wireless protocol and frequency channel at issue. On the other hand, the present method could also be carried out without any consideration of GPS location or distance but rather strictly based on metrics such as those noted above regarding the communication signaling between the controller and the mobile craft.

In practice, the detecting of threshold degradation will occur independently at the controller and at the mobile craft, in the sense that each will do its own evaluation and come to the conclusion that the link is threshold degraded. As such, the controller and mobile craft may not detect the threshold degradation at the precisely the same time as each other, and they may differ in their bases for detecting threshold degradation. In a situation where the controller and mobile craft become sufficiently distant from each other or interference on the link becomes sufficiently high, however, the expectation is that both will ultimately detect threshold degradation of the wireless link.

Independently, the controller and mobile craft will then respond to its own detecting of threshold degradation of the direct wireless link by acquiring a cellular wireless connection and entering into communication with the control server 44.

In practice, the controller and mobile craft may each have its respective cellular radio powered off at this point to help conserve battery power (though the controller, if provided as application logic running on a cell phone, may have its cellular radio powered on generally). In response to detecting of threshold degradation of the wireless link, the controller and mobile craft may each thus power on its cellular radio and then use its cellular radio to acquire a cellular wireless connection, including a radio-link-layer connection with a RAN as discussed above. Further, in acquiring a cellular wireless connection, the controller and mobile craft may each also acquire an IP address so as to facilitate communication on the transport network 42.

The controller and mobile craft may then each establish communication via its respective cellular wireless connection with the control server 44. By way of example, they may each transmit a respective packet-based message to the control server, providing the control server with information to enable the control server to engage in authorization. For instance, they may each transmit to the control server a respective set of data including its IP address, a user name, password, and/or other credentials, and the control server may refer to pre-established authorization data as a basis to thereby identify the transmitting entity and to determine whether the transmitting entity is authorized to engage in control communication. Further, they may each transmit to the control server the control-communication identifier that identifies the control communication they were engaged in via their direct wireless link.

In practice, once the control server is in communication with both the controller and the mobile craft, the control server may also determine whether the controller and mobile craft are to engage in control communication with each other. For instance, the control server may determine whether the control server and mobile craft each provided the same control-communication identifier and, if so, may deem them authorized to engage in control communication with each other but, if not, may deem them not authorized to engage in control communication with each other. Alternatively or additionally, the control server may maintain or otherwise have access to pre-provisioned control-permission data that indicates pairs of controllers and mobile craft that can engage in control communication with each other, and the control server may refer to that data, in view of credentials provided by the controller and the mobile craft, to determine whether or not the controller and mobile craft are authorized to engage in control communication with each other and may proceed accordingly.

Once the control server has determined that the controller and mobile craft are to engage in control communication with each other, the control server may then automatically bridge communication between the controller and the mobile craft and may notify both the controller and mobile craft that the bridging has commenced. The bridging may then involve receiving control communications (e.g., control directives) from the controller and forwarding those communications to the mobile craft, and receiving control communications (e.g., acknowledgements) from the mobile craft and forwarding them to the controller. Thus, with this arrangement, the controller may conveniently continue to control the mobile craft, with each communicating with the control server via its respective acquired cellular wireless connection, and with the control server bridging their respective communications.

In a further respect, while so engaged in bridged control communication via the control server, the controller and mobile craft may also continue to search for availability of a direct wireless communication link with each other, by using their short-range wireless radios to ping one another. If they detect availability of short-range wireless communication with each other, they may then each independently drop their cellular wireless communications with the control server (perhaps engaging in closing signaling with the control server) and revert to direct wireless control communication with each other.

Figure 3:
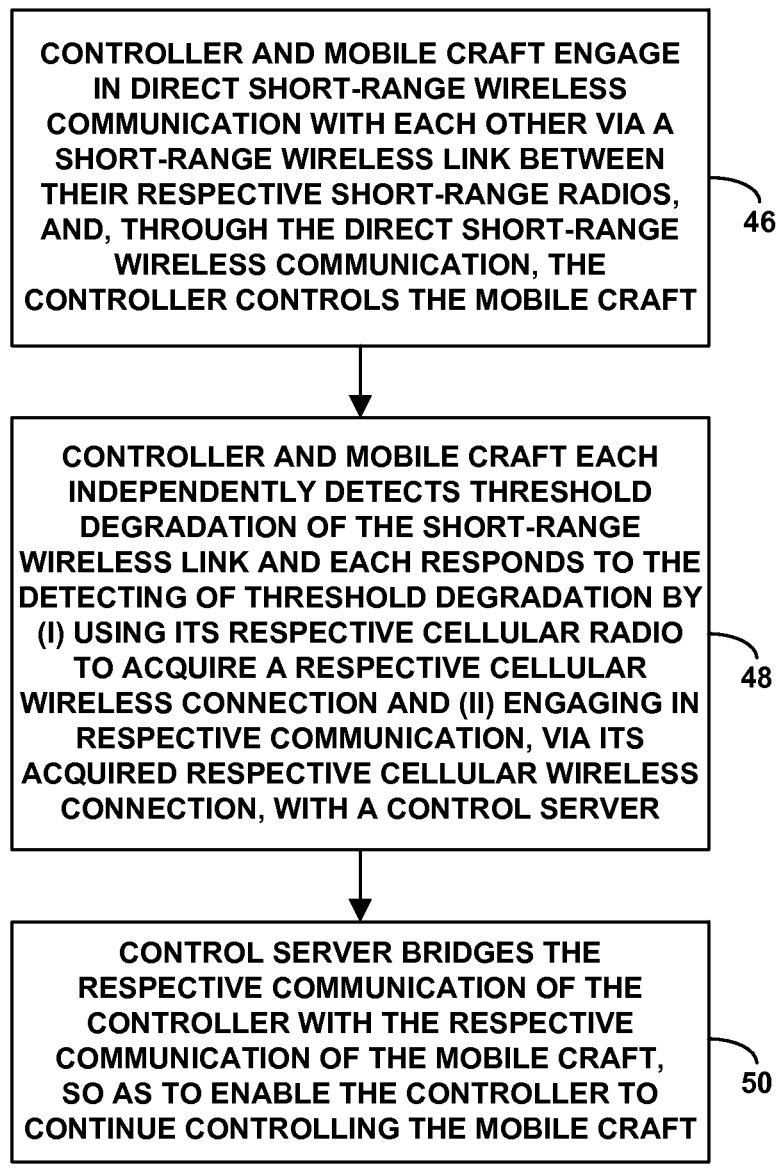
FIG. 3 is a flow chart depicting operations in an example method.

FIG. 3 is next a flow chart depicting some of the operations discussed above, as a method for managing control communication between a controller and a mobile craft, to facilitate control of the mobile craft by the controller, where the controller includes a respective cellular radio and a respective short-range radio, and where the mobile craft also includes a respective cellular radio and a respective short-range radio.

As shown in FIG. 3, at block 46, the controller and mobile craft engage in direct short-range wireless communication with each other via a short-range wireless link between their respective short-range radios, and, through the direct short-range wireless communication, the controller controls the mobile craft. At block 48, which may occur during the course of the controller so controlling the mobile craft, the controller and mobile craft then each independently detects threshold degradation of the short-range wireless link and each responds to the detecting of threshold degradation by (i) using its respective cellular radio to acquire a respective cellular wireless connection and (ii) engaging in respective communication, via its acquired respective cellular wireless connection, with a control server. In turn, at block 50, the control server then bridges the respective communication of the controller with the respective communication of the mobile craft, so as to enable the controller to continue controlling the mobile craft.

In this method, as noted above, the act of controlling the mobile craft may involve transmitting to the mobile craft one or more directives that control operation of the mobile craft, such as movement of the mobile craft. Further, transmitting each of the one or more directives may be in response to user input into the controller.

The act of the controller engaging in respective communication with the control server may then involve the controller transmitting at least one of the directives to the control server, and the act of the mobile craft engaging in respective communication with the control server may involve the mobile craft receiving from the control server the at least one directive transmitted from the controller to the control server. Thus, the act of the control server bridging the respective communication of the controller with the respective communication of the mobile craft may involve the control server receiving the directive(s) from the controller and transmitting the received directive(s) to the mobile craft.

Moreover, in line with the discussion above, the act of the control server bridging the respective communication of the controller with the respective communication of the mobile craft may occur automatically in response to the control server receiving from both the controller and the mobile craft a particular control-communication identifier. In addition, the method may also include the control server determining that the controller is authorized to control the mobile craft, in which case the act of the control server bridging the respective communication of the controller with the respective communication of the mobile craft may be in response to the control server determining that the controller is authorized to control the mobile craft.

Also in line with the discussion above, the act of detecting threshold degradation of the short-range wireless link may involve detecting at least one condition such as (i) threshold low receive signal strength, (ii) threshold low signal to noise ratio, (iii) threshold high communication error rate, and/or (iv) absence of communication.

Further, as discussed above, the control server may reside on a packet-switched network, the respective cellular wireless connection acquired by the controller may be a connection with a first RAN that provides connectivity with the packet-switched network, and the respective cellular wireless connection acquired by the mobile craft may be a connection with a second RAN that provides connectivity with the packet-switched network. And the second RAN could be the first RAN (i.e., they could be a single RAN).

In turn, as also discussed above, the act of the controller using its respective cellular radio to acquire a respective cellular wireless connection may involve the controller engaging in access signaling with the first RAN and requesting a radio-link-layer connection with the first RAN, and the act of the mobile craft using its respective cellular radio to acquire a respective cellular wireless connection may involve the mobile craft engaging in access signaling with the second RAN and requesting a radio-link-layer connection with the second RAN. Moreover, the controller and mobile craft may each power on their respective cellular radios to facilitate acquiring of their respective cellular wireless connections.

Figure 4:
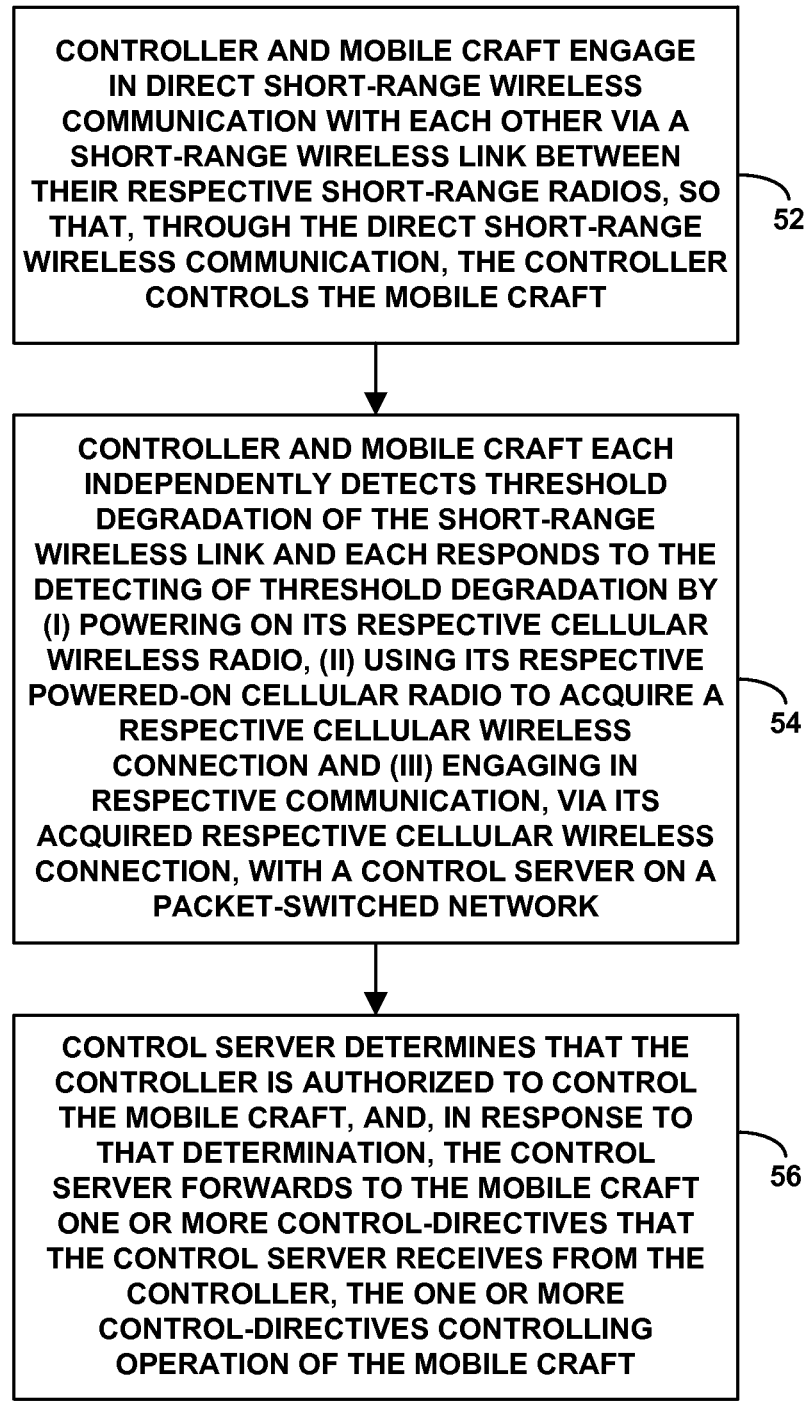
FIG. 4 is another flow chart depicting operations in an example method.

FIG. 4 is next another flow chart depicting a different combination of some of the operations described above, similarly in a method for managing control communication between a controller and a mobile craft, to facilitate control of the mobile craft by the controller, wherein the controller includes a respective cellular radio and a respective short-range radio, and wherein the mobile craft also includes a respective cellular radio and a respective short-range radio.

As shown in FIG. 4, at block 52, the controller and mobile craft engage in direct short-range wireless communication with each other via a short-range wireless link between their respective short-range radios, where, through the direct short-range wireless communication, the controller controls the mobile craft. Further, at block 54, the controller and mobile craft each independently detects threshold degradation of the short-range wireless link and each responds to the detecting of threshold degradation by (i) powering on its respective cellular wireless radio, (ii) using its respective powered-on cellular radio to acquire a respective cellular wireless connection and (iii) engaging in respective communication, via its acquired respective cellular wireless connection, with a control server on a packet-switched network. And at block 56, the control server determines that the controller is authorized to control the mobile craft, and, in response to that determination, the control server forwards to the mobile craft one or more control-directives that the control server receives from the controller, the one or more control-directives controlling operation of the mobile craft.

Various features discussed above may apply in the context of this method as well. By way of example, the control server may have access to control-permission data, in which case the act of determining that the controller is authorized to control the mobile craft may involve referring to the control-permission data to determine that the control server is authorized to control the mobile craft. Other examples are possible as well.

Finally, another set of operations that can be carried out in accordance with the present disclosure is possible, similarly to facilitate management of control communication between a controller and a mobile craft, so that the controller can control the mobile craft. Here again, the controller would include a respective cellular radio and a respective short-range radio, and the mobile craft would also include a respective cellular radio and a respective short-range radio.

This set of operations includes providing the controller and mobile craft, such as by selling or otherwise distributing both entities for use, and/or perhaps selling or otherwise distributing application software that can run on a computing device such as a personal computer, tablet, or smart phone to effectively make the device into a controller, and by selling or otherwise distributing the mobile craft for use. In line with the discussion above, the controller and mobile craft are each configured to engage in direct short-range wireless communication with each other via a short-range wireless link between their respective short-range radios, so that, when they are in such communication through the direct short-range wireless communication, the controller controls the mobile craft.

Further, this set of operations includes operating a control server for automatically bridging control communications between the controller and the mobile craft. For instance, in line with the discussion above, this may involve implementing such a control server on a packet-switched network such that the controller and mobile craft can communicate with the control server via respective cellular wireless connections.

As discussed above, the controller and mobile craft are each configured to independently detect threshold degradation of the short-range wireless link and to each respond to the detecting of threshold degradation by (i) using its respective cellular radio to acquire a respective cellular wireless connection and (ii) engaging in respective communication, via its acquired respective cellular wireless connection, with the control server. And the control server is configured to automatically determine that the controller is authorized to control the mobile craft, and, in response to the determining, to forward to the mobile craft one or more control-directives that the control server receives from the controller, the one or more control-directives controlling operation of the mobile craft.

Exemplary embodiments have been described above. Those skilled in the art will understand, however, that changes and modifications may be made to these embodiments without departing from the true scope and spirit of the invention.

We claim:

1. A method for managing control communication between a controller and a mobile craft, to facilitate control of the mobile craft by the controller, wherein the controller includes a respective cellular radio and a respective short-range radio, and wherein the mobile craft also includes a respective cellular radio and a respective short-range radio, the method comprising:

the controller and mobile craft engaging in direct short-range wireless communication with each other via a short-range wireless link between their respective short-range radios, wherein, through the direct short-range wireless communication, the controller controls the mobile craft;

the controller and mobile craft each independently detecting threshold degradation of the short-range wireless link and each responding to the detecting of threshold degradation by (i) using its respective cellular radio to acquire a respective cellular wireless connection and (ii) engaging in respective communication, via its acquired respective cellular wireless connection, with a control server; and the control server bridging the respective communication of the controller with the respective communication of the mobile craft, to enable the controller to continue controlling the mobile craft, wherein controlling the mobile craft comprises controlling movement of the mobile craft.

2. The method of claim 1, wherein controlling the mobile craft comprises transmitting to the mobile craft one or more directives that control operation of the mobile craft.

3. The method of claim 2, wherein transmitting each of the one or more directives is in response to user input into the controller.

4. The method of claim 2, wherein the controller engaging in respective communication with the control server comprises the controller transmitting at least one of the directives to the control server, wherein the mobile craft engaging in respective communication with the control server comprises the mobile craft receiving from the control server the at least one directive transmitted from the controller to the control server, and wherein bridging the respective communication of the controller with the respective communication of the mobile craft comprises receiving the at least one directive from the controller and transmitting the received at least one directive to the mobile craft.

5. The method of claim 1, wherein the control server bridging the respective communication of the controller with the respective communication of the mobile craft occurs automatically in response to the control server receiving from both the controller and the mobile craft a particular control-communication identifier.

6. The method of claim 1, further comprising the control server determining that the controller is authorized to control the mobile craft, wherein the control server bridging the respective communication of the controller with the respective communication of the mobile craft is in response to the control server determining that the controller is authorized to control the mobile craft.

7. The method of claim 1, wherein detecting threshold degradation of the short-range wireless link comprises detecting at least one of (i) threshold low receive signal strength, (ii) threshold low signal to noise ratio, (iii) threshold high communication error rate, and (iv) absence of communication.

8. The method of claim 1, wherein the control server resides on a packet-switched network, wherein the respective cellular wireless connection acquired by the controller is a connection with a first radio access network (RAN) that provides connectivity with the packet-switched network, and wherein the respective cellular wireless connection acquired by the mobile craft is a connection with a second RAN that provides connectivity with the packet-switched network.

9. The method of claim 8, wherein the second RAN is the first RAN.

10. The method of claim 8, wherein the controller using its respective cellular radio to acquire a respective cellular wireless connection comprises the controller engaging in access signaling with the first RAN and requesting a radio-link-layer connection with the first RAN, and wherein the mobile craft using its respective cellular radio to acquire a respective cellular wireless connection comprises the mobile craft engaging in access signaling with the second RAN and requesting a radio-link-layer connection with the second RAN.

11. The method of claim 1, further comprising the controller and mobile craft each responding to the threshold degradation of the short-range wireless link by powering on its respective cellular radio so as to then acquire its respective cellular wireless connection.

12. A method for managing control communication between a controller and a mobile craft, to facilitate control of the mobile craft by the controller, wherein the controller includes a respective cellular radio and a respective short-range radio, and wherein the mobile craft also includes a respective cellular radio and a respective short-range radio, the method comprising:

the controller and mobile craft engaging in direct short-range wireless communication with each other via a short-range wireless link between their respective short-range radios, wherein, through the direct short-range wireless communication, the controller controls the mobile craft;

the controller and mobile craft each independently detecting threshold degradation of the short-range wireless link and each responding to the detecting of threshold degradation by (i) powering on its respective cellular wireless radio, (ii) using its respective powered-on cellular radio to acquire a respective cellular wireless connection and (iii) engaging in respective communication, via its acquired respective cellular wireless connection, with a control server on a packet-switched network; and the control server determining that the controller is authorized to control the mobile craft, and, in response to the determining, the control server forwarding to the mobile craft one or more control-directives that the control server receives from the controller, the one or more control-directives controlling operation of the mobile craft, wherein operation of the mobile craft comprises movement of the mobile craft.

13. The method of claim 12, wherein transmitting each of the one or more directives is in response to user input into the controller.

14. The method of claim 12, wherein the control server has access to control-permission data, and wherein determining that the controller is authorized to control the mobile craft comprises referring to the control-permission data to determine that the control server is authorized to control the mobile craft.

15. The method of claim 12, wherein detecting threshold degradation of the short-range wireless link comprises detecting at least one of (i) threshold low receive signal strength, (ii) threshold low signal to noise ratio, (iii) threshold high communication error rate, and (iv) absence of communication.

16. The method of claim 12, wherein the respective cellular wireless connection acquired by the controller is a connection with a first radio access network (RAN) that provides connectivity with the packet-switched network, and wherein the respective cellular wireless connection acquired by the mobile craft is a connection with a second RAN that provides connectivity with the packet-switched network.

17. The method of claim 16, wherein the controller using its cellular radio to acquire a respective cellular wireless connection comprises the controller engaging in access signaling with the first RAN and requesting a radio-link-layer connection with the first RAN, and wherein the mobile craft using its cellular radio to acquire a respective cellular wireless connection comprises the mobile craft engaging in access signaling with the second RAN and requesting a radio-link-layer connection with the second RAN.

18. A method for managing control communication between a controller and a mobile craft, to facilitate control of the mobile craft by the controller, wherein the controller includes a respective cellular radio and a respective short-range radio, and wherein the mobile craft also includes a respective cellular radio and a respective short-range radio, the method comprising:

providing the controller and mobile craft, wherein the controller and mobile craft are each configured to engage in direct short-range wireless communication with each other via a short-range wireless link between their respective short-range radios, wherein, through the direct short-range wireless communication, the controller controls the mobile craft; and operating a control server for automatically bridging control communications between the controller and the mobile craft, wherein the controller and mobile craft are each configured to independently detect threshold degradation of the short-range wireless link and to each respond to the detecting of threshold degradation by (i) using its respective cellular radio to acquire a respective cellular wireless connection and (ii) engaging in respective communication, via its acquired respective cellular wireless connection, with the control server, and wherein the control server is configured to automatically determine that the controller is authorized to control the mobile craft, and, in response to the determining, to forward to the mobile craft one or more control-directives that the control server receives from the controller, the one or more control-directives controlling operation of the mobile craft, wherein operation of the mobile craft comprises movement of the mobile craft.

* * * * *